United States Patent
Jing (10) Patent No.: US 6,424,759 B1
(45) Date of Patent: Jul. 23, 2002

(54) MECHANICALLY ACTUATED MXN OPTICAL SWITCH MATRIX

(75) Inventor: Xingliang Jing, Fremont, CA (US)

(73) Assignee: Primawave Photonics, Inc., Fremont, CA (US)

(*) Notice: Subject to any disclaimer, the term of this patent is extended or adjusted under 35 U.S.C. 154(b) by 0 days.

(21) Appl. No.: 09/416,441

(22) Filed: Oct. 12, 1999

(51) Int. Cl.[7] .............................. G02B 6/26; G02B 6/42
(52) U.S. Cl. .............................. 385/17; 385/18; 385/19; 385/20; 385/47
(58) Field of Search .............................. 385/16–18, 22, 385/24, 33–37, 23, 47; 359/618, 627–629

(56) References Cited

U.S. PATENT DOCUMENTS

| | | | |
|---|---|---|---|
| 4,674,828 A | * 6/1987 | Takahashi et al. | 350/96.13 |
| 4,834,488 A | 5/1989 | Lee | 350/96.2 |
| 5,420,946 A | 5/1995 | Tsai | 385/22 |
| 5,436,986 A | 7/1995 | Tsai | 385/22 |
| 5,438,449 A | 8/1995 | Chabot et al. | 359/216 |
| 5,479,541 A | 12/1995 | Pan | 385/22 |
| 5,594,820 A | 1/1997 | Garel-Jones et al. | 385/22 |
| 5,611,009 A | 3/1997 | Pan | 385/22 |
| 5,642,446 A | 6/1997 | Tsai | 385/16 |
| 5,742,712 A | 4/1998 | Pan et al. | 385/18 |
| 5,815,614 A | 9/1998 | Pan | 385/22 |
| 5,828,800 A | 10/1998 | Henry et al. | 385/20 |
| 5,838,847 A | 11/1998 | Pan et al. | 385/18 |
| 5,841,917 A | * 11/1998 | Jungerman et al. | 385/17 |
| 5,867,617 A | 2/1999 | Pan et al. | 385/18 |
| 5,892,864 A | 4/1999 | Stoll et al. | 385/14 |
| 5,903,687 A | 5/1999 | Young et al. | 385/17 |
| 5,920,665 A | 7/1999 | Presby | 385/16 |
| 5,923,798 A | 7/1999 | Aksyuk et al. | 385/19 |
| 5,960,132 A | 9/1999 | Lin | |
| 5,982,554 A | 11/1999 | Goldstein et al. | 359/629 |
| 6,014,478 A | 1/2000 | Spaeth | 385/18 |
| 6,144,781 A | * 11/2000 | Goldstein et al. | 385/18 |
| 6,269,201 B1 | 7/2001 | Ko et al. | 385/22 |
| 6,317,530 B1 | * 11/2001 | Ford | 385/17 |

FOREIGN PATENT DOCUMENTS

| | | | | |
|---|---|---|---|---|
| EP | 0 880 040 A2 | | 11/1998 | G02B/6/26 |
| JP | 57-109903 | | 7/1982 | |
| JP | 57109903 A | * | 7/1982 | G02B/5/14 |
| WO | WO 99/37013 | | 7/1999 | H02N/1/00 |

OTHER PUBLICATIONS

Lin, et al., Free–Space Micromachined Optical Switches with Submillisecond Switching Time for Large–Scale Optical Crossconnects, IEEE, 10(4):525–527 (1998).

* cited by examiner

Primary Examiner—Frank G. Font
Assistant Examiner—Michael P. Mooney
(74) Attorney, Agent, or Firm—Brobeck, Phleger & Harrison LLP (57) ABSTRACT

An M×N mechanically actuated optical switch matrix includes a plurality of optical reflectors arranged in an array comprising a plurality of columns and rows, at least some of which are movable between their on and off positions, a plurality of primary optical ports and a plurality of secondary optical ports. More than one optical reflector may be switched on simultaneously to establish optical signal channels between respective primary and secondary optical ports.

10 Claims, 4 Drawing Sheets

MECHANICALLY ACTUATED MXN OPTICAL SWITCH MATRIX

BACKGROUND OF THE INVENTION

1. Field of the Invention

The present invention relates to optical switches, and more particularly, to mechanically actuated optical switches.

2. Background

Optical switches have been developed for switching optical networks in broadband telecommunications systems. Because of increasing demand for high speed broadband data communications, optical wavebands including infrared and visible light wavelengths are increasingly being used as data carriers in telecommunications systems to satisfy the demand for high speed broadband data transmission. Conventional optical switches have been implemented in a typical optical fiber telecommunications network to switch the optical paths of information-carrying light to different optical fiber cables.

Conventional optical switches typically fall into two broad categories of non-integrated optical switches and integrated optical switches. Among the non-integrated optical switches, moving fibers have been used to change optical paths between different input or output fibers. In a conventional moving fiber switch, either the input optical fibers or the output optical fibers are moved mechanically to switch the optical path between different input or output optical fibers.

However, conventional moving fiber switches typically suffer from alignment problems because it is difficult to align the input and output fibers with a high degree of accuracy and repeatability. Alignment of single mode fibers can be especially difficult because of their small diameters. Even a slight misalignment between the selected input and output fibers through which optical transmission supposedly occurs may result in an unacceptably high insertion loss because the output fiber is not in the perfect position on the optical path to receive the light transmitted from the input fiber.

In order to avoid the problem of misalignment in a typical fiber moving switch, expensive and complicated mechanisms are usually required to move either the input or the output optical fibers to achieve acceptable alignment accuracy and repeatability. Furthermore, conventional moving fiber switches typically have slow switching speeds which may limit their applications. in optical fiber communications networks which require high-speed switching operations.

Moving reflectors have also been used in conventional non-integrated optical switches to switch optical paths between different input or output optical fibers instead of moving the input or output fibers for optical alignment. Moving reflector switches are usually capable of faster switching operations than conventional moving fiber switches. However, conventional reflector switches typically also suffer from the problems of mechanical stability and repeatability. After a large number of repeated on and off switching operations, the optical reflectors in a conventional reflector switch may deviate from their designed reflection angles because of the problems with mechanical stability and repeatability. Even a slight deviation of reflection angle may cause the optical path of reflected light to be misaligned with a respective output fiber or another reflector which is supposedly positioned to receive the reflected light.

Therefore, there is a need for an optical switch with a high degree of reliability after a large number of repeated on and off switching operations which are typically required in modern optical fiber telecommunications networks. Furthermore, there is a need for an optical switch which provides accurate optical alignments between the reflectors and the optical fibers without requiring expensive or delicate mechanical assemblies for switching the reflectors between their on and of f positions. Furthermore, there is a need for an optical switch which is capable of high speed switching operations for a plurality of input and output optical fibers simultaneously.

SUMMARY OF THE INVENTION

The present invention provides a mechanically actuated M×N optical switch matrix, roughly comprising a plurality of primary optical ports, a plurality of secondary optical ports, a support plate having first and second surfaces opposite each other, a reflector array comprising a plurality of movable optical reflectors each capable of occupying an on position to reflect light from a respective one of the primary optical ports to a respective one of the secondary optical ports, and a plurality of actuators connected to the movable optical reflectors respectively to drive the movable optical reflectors between their on and off positions.

In an embodiment, the on positions of the movable optical reflectors are above the first surface of the support plate whereas the actuators are positioned below the second surface of the support plate. In a further embodiment, the support plate is provided with apertures, and the actuators are connected to the movable optical reflectors respectively through a plurality of levers which are movably positioned through the apertures in the support plate to drive the respective movable optical reflectors.

In an embodiment, each of the movable optical reflectors is capable of being switched to its on position when it is moved by the respective lever away from the first surface of the support plate to a predetermined position above the first surface of the support plate to intercept light on an incident optical path from the respective primary optical port. The movable optical reflector has a reflection surface angled with respect to the respective incident optical path when the movable optical reflector is in its on position to reflect the light onto a reflected optical path which leads to one of the output optical fibers. When the movable optical reflector is switched from its on position to its off position, it is moved by the lever away from the incident optical path toward the first surface of the support plate. In a further embodiment, the off position of the movable optical reflector is within the aperture in the support plate.

In an embodiment, the actuators comprise relay switches capable of generating repetitive movements in opposite directions. Either prisms or mirrors may be used as optical reflectors in the M×N optical switch according to the present invention, although other types of optical reflectors may also be used. In an embodiment, the reflection surface of each of the optical reflectors is angled at 45° with respect to its incident optical path to reflect the light onto a reflected optical path which is perpendicular to the matrix incident optical path.

In an embodiment, a plurality of lenses are provided adjacent terminations of the input and output optical fibers to collimate light on the respective optical paths. In a further embodiment, the lenses and end portions of the respective optical fibers adjacent their terminations are housed in a plurality of collimator assemblies, respectively, which are fixedly connected to the first surface of the support plate. In yet a further embodiment, the collimator assemblies are connected to the first surface of the support plate by laser welding for improved mechanical stability and reliability.

Advantageously, the mechanically actuated M×N optical switch matrix according to the present invention can be implemented in an optical fiber telecommunications network which requires fast switching of optical communications signal channels between a plurality of input optical fibers and a plurality of output optical fibers. The M×N optical switch matrix according to the present invention is able to achieve a high degree of mechanical reliability and repeatability for accurate optical alignments after a large number of frequent switching operations. Furthermore, optical switching can be achieved with a high degree of reliability without requiring expensive or delicate mechanisms for actuating the movable optical reflectors in the optical switch matrix according to the present invention.

BRIEF DESCRIPTION OF THE DRAWINGS

The invention will be described with respect to particular embodiments thereof, and references will be made to the drawings in which.

DETAILED DESCRIPTION

Figure 1:
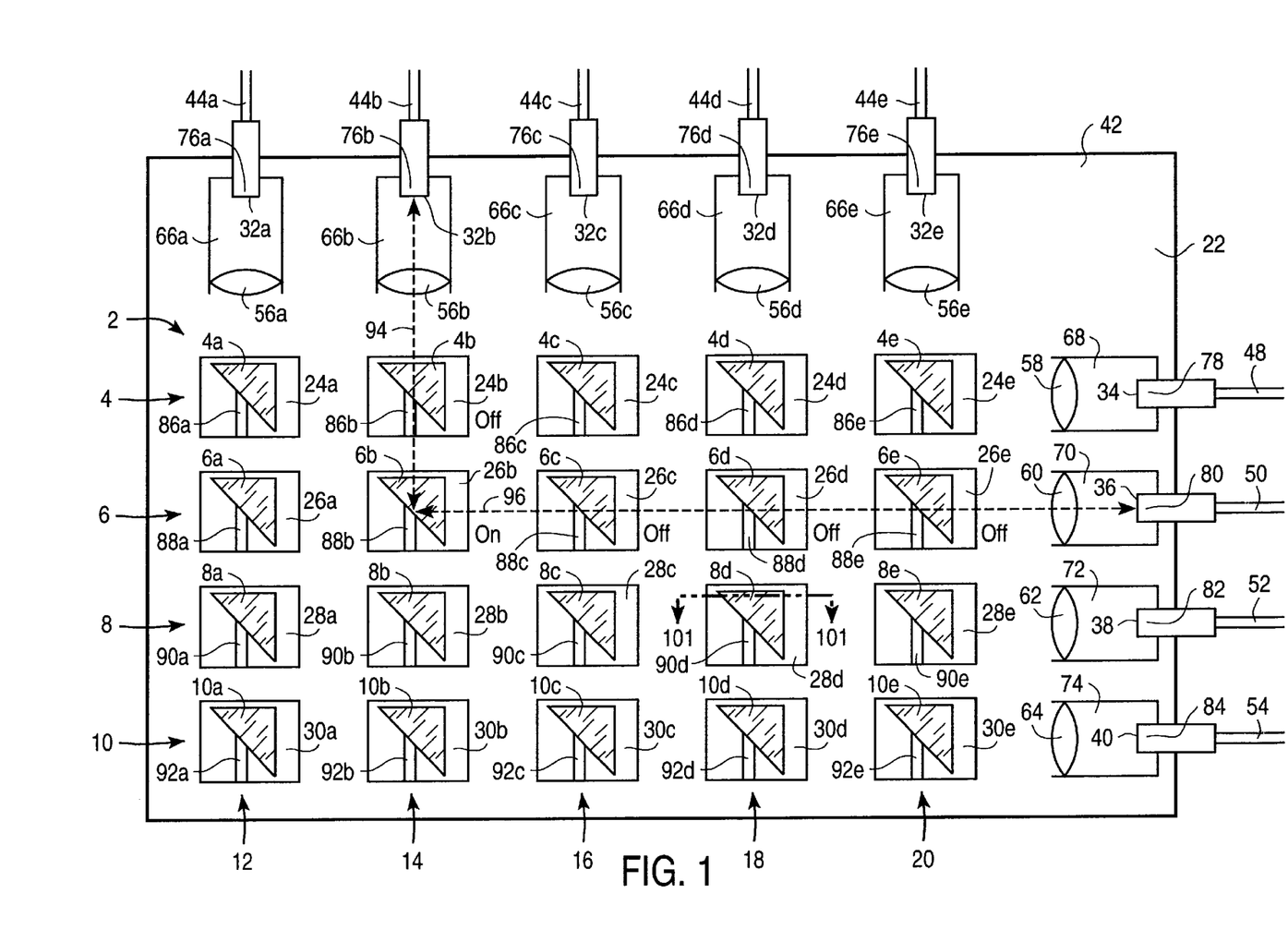
FIG. 1 shows a top plan view of an embodiment of a mechanically actuated M×N optical switch matrix according to the present invention.

FIG. 1 shows a top plan view of an embodiment of a mechanically actuated M×N optical switch matrix according to the present invention. As shown in FIG. 1, a reflector array 2 comprises a plurality of optical reflectors 4a, 4b, . . . 4e, 6a, 6b, . . . 6e, 8a, 8b, . . . 8e and 10a, 10b, . . . 10e, arranged in a plurality of rows 4, 6, 8 and 10 and a plurality of columns 12, 14, 16, 18 and 20. All of the optical reflectors in the reflector array 2 are shown as prisms in FIG. 1. A support plate 22 is provided with a plurality of apertures 24a, 24b, . . . 24e, 26a, 26b, . . . 26e, 28a, 28b, . . . 28e, and 30a, 30b, . . . 30e.

In the embodiment shown in FIG. 1, the apertures in the support plate 22 are also arranged in a plurality of columns and rows. The apertures are aligned respectively with the optical reflectors in the reflector array 2. In a different embodiment, two or more optical reflectors in any one of the rows or columns may share a larger aperture. In another embodiment, all of the optical reflectors in the reflector array may share a single aperture if the reflector array is sufficiently small and adequate spacing is provided for mechanical assemblies for actuating the optical reflectors. For example, a single aperture may be provided for a 2×2 optical switch matrix which is within the scope of the present invention.

As shown in FIG. 1, a plurality of primary optical ports 32a, 32b, . . . 32e and a plurality of secondary optical ports 34, 36, 38 and 40 are provided on a first surface which is the top surface 42 of the support plate 22. Each of the primary and secondary optical ports may be used as either an input optical port or an output optical port. When the primary optical ports 32a, 32b, . . . 32e are used as input optical ports, for example, a plurality of input optical fibers 44a, 44b, . . . 44e are connected to the optical switch matrix with their terminations forming the primary optical ports 32a, 32b, . . . 32e, respectively. In a similar manner, a plurality of output optical fibers 48, 50, 52 and 54 are connected to the optical switch matrix with their terminations forming the secondary optical ports 34, 36, 38 and 40, respectively.

In a further embodiment, a plurality of primary collimator lenses 56a, 56b, . . . 56e are provided adjacent the primary optical ports 32a, 32b, . . . 32e, respectively, to collimate light traveling along optical paths leading to the respective primary optical ports. In a similar manner, a plurality of secondary collimator lenses 58, 60, 62 and 64 are provided adjacent the secondary optical ports 34, 36, 38 and 40, respectively, to collimate light traveling along optical paths leading to the respective secondary optical ports. Because light tends to disperse as it travels from an optical fiber termination into free space, the collimator lenses are provided along the respective optical paths to form substantially parallel optical beams in the optical switch matrix according to the present invention.

In a further embodiment, a plurality of primary collimator assemblies 66a, 66b, . . . 66e and a plurality of secondary collimator assemblies 68, 70, 72 and 74 are provided on the first surface 42 of the support plate 22 to house the collimator lenses and end portions of the input and output optical fibers. The primary collimator assemblies 66a, 66b, . . . 66e house the collimator lenses 56a, 56b, . . . 56e as well as end portions 76a, 76b, . . . 76e of the input optical fibers 44a, 44b, . . . 44e adjacent their terminations, respectively. In a similar manner, the secondary collimator assemblies 68, 70, 72 and 74 house the secondary collimator lenses 58, 60, 62 and 64 as well as end portions 78, 80, 82 and 84 of the output optical fibers 48, 50, 52 and 54 adjacent their terminations, respectively. In yet a further embodiment, the collimator assemblies 66a, 66b, . . . 66e, 68, 70, 72 and 74 are fixedly connected to the first surface 42 of the support plate 22 by laser welding for a high degree of mechanical rigidity and reliability to ensure accurate alignments of respective optical paths between the optical reflectors and the input and output optical ports.

The movable optical reflectors in the reflector array 2 are each individually movable with respect to the support plate 22. Each of the movable optical reflectors can be mechanically switched between its on and off positions. The mechanical movements for switching the optical reflectors between their on and off positions are generated by a plurality of actuators, which are positioned below the second surface (not shown in the top plan view of FIG. 1) opposite the first surface 42 of the support plate 22 and are obscured by the support plate 22 in the top plan view of FIG. 1. A plurality of levers 86a, 86b, . . . 86e, 88a, 88b, . . . 88e, 90a, 90b, . . . 90e, and 92a, 92b, . . . 92e are connected between the actuators and the optical reflectors 4a, 4b, . . . 4e, 6a, 6b, . . . 6e, 8a, 8b, . . . 8e, and 10a, 10b, . . . 10e to transfer mechanical movements generated by the actuators to the optical reflectors, respectively. Embodiments of mechanical assemblies for actuating the optical reflectors in the M×N optical switch matrix according to the present invention will be described below in reference to the sectional views of FIGS. 3 and 4.

In an embodiment, each of the movable optical reflectors in the reflector array is capable of occupying an on position to intercept incoming light on a respective first optical path above the first surface 42 of the support plate 22 from a respective primary optical port, or an off position away from the respective first optical path. For example, FIG. 1 shows one of the optical reflectors 6*b* in its on position to intercept incoming light traveling along a respective first optical path 94 from the primary optical port 32*b*. If the optical reflector 6*b* is in its on position while optical reflectors 4*b*, 6*c*, 6*d* and 6*e* are in their off positions, the incoming light on the first optical path 94 is reflected by the optical reflector 6*b* onto a second optical path 96 which leads to the secondary optical port 36.

The optical reflector 6*b*, which is shown as a prism in FIG. 1, has a reflection surface 98 angled at 45° with respect to the first optical path 94 when the optical reflector 6*b* is in its on position to reflect the light from the first optical path 94 onto the second optical path 96, which is perpendicular to the first optical path 94. In an embodiment, each of the optical reflectors is capable of being switched from its on position to its off position by moving toward the first surface 42 of the support plate 22 away from the respective first optical path, which in an embodiment is parallel to the first surface 42 of the support plate 22.

In this embodiment, each of the optical reflectors is switched from its off position to its on position by moving away from the first surface 42 of the support plate 22 to a predetermined position above the first surface 42 of the support plate 22 to intercept the respective first optical path. Because light has the property of reciprocity, any of the secondary optical ports 34, 36, 38 and 40 may be used as input optical ports while any of the primary optical ports 32*a*, 32*b*, ... 32*e* may be used as output optical ports. For example, light transmitted from the secondary optical port 36 may be transmitted along the optical path 96 and reflected by the optical reflector 6*b* onto the optical path 94 leading to the primary optical port 32*b* if the optical reflector 6*b* is in its on position while optical reflectors 4*b*, 6*c*, 6*d* and 6*e* along the optical paths 94 and 96 are in their off positions.

Any of the movable optical reflectors in the reflector array 2 may be switched on to establish transmission of optical signals between the respective input and output optical fibers as long as other optical reflectors, if any, along the respective input and output optical paths are in their off positions. In an embodiment, only one of the optical reflectors is selected at a time to be switched to its on position to reflect light from a respective first optical path along which an input optical signal is transmitted onto a respective second optical path leading to a respective secondary optical port which is selected for outputting the optical signal. Other optical reflectors which are not located along the first or the second optical path may remain in their on or of off positions as long as the selected optical reflector is switched to its on position while each of the optical reflectors along either the first or the second optical path is in its off position. For example, when the optical reflector 6*b* is selected to establish optical transmission between the input and output optical fibers 44*b* and 50, optical reflectors such as reflectors 8*b* and 4*c*, which are not located along either the first optical path 94 or the second optical path 96, have no effect on the optical transmission between the input and output optical fibers 44*b* and 50.

In an embodiment, the M×N optical switch matrix according to the present invention is capable of establishing a plurality of optical communications signal channels between different input and output optical fibers simultaneously. For example, while the optical signal channel is established between the input and output optical fibers 44*b* and 50 by the optical reflector 6*b* in the example described above, another optical signal channel can be established between the input and output optical fibers 44*a* and 52 by switching the optical reflector 8*a* to its on position and switching optical reflectors 4*a*, 6*a*, 8*b*, 8*c*, 8*d* and 8*e* to their off positions. Furthermore, a third optical signal channel may also be established simultaneously, for example, between the input and output optical fibers 44*d* and 48 by switching the optical reflector 4*d* to its on position and switching the optical reflector 4*e* to its off position. The only requirement for establishing multiple optical signal channels simultaneously is that only the optical reflectors in different columns and rows be selected to be switched on to allow simultaneous optical transmission between different input and output optical fibers.

In the embodiment shown in FIG. 1, each of the movable optical reflectors in the reflector array 2 can be switched on by moving to a designated position to intercept a respective optical path above the first surface 42 of the support plate 2. Each of the movable optical reflectors can be switched to its off position by moving away from the respective optical path to a position below the respective optical path closer to the first surface 42 of the support plate 22. In an embodiment, the off position of each of the optical reflectors is within the respective aperture in the support plate 22. In another embodiment, the off position of each of the optical reflectors is a lower position which is still above the first surface 42 of the support plate 22 but completely off the respective optical path. In yet another embodiment, each of the optical reflectors is switched off by moving through the respective aperture to a position below the second surface of the support plate 22.

In the embodiment shown in FIG. 1, all of the optical reflectors in the reflector array 2 comprise movable optical reflectors. However, one of the optical reflectors 10*a* in the reflector array 2 may be a fixed optical reflector on the first surface 42 of the support plate 22 in a different embodiment to establish an optical signal channel between the input and output optical fibers 44*a* and 54, because the optical reflector 10*a* does not block any optical paths for any of the other optical reflectors 4*a*, 4*b*, ... 4*e*, 6*a*, 6*b*, ... 6*e*, 8*a*, 8*b*, ... 8*e*, and 10*b*, 10*c*, ... 10*e* in the reflector array 2. In this embodiment, the aperture 30*a* and the lever 92*a* are not needed for the fixed optical reflector 10*a*. Furthermore, a mechanical assembly need not be provided below the second surface of the support plate 22 to actuate the optical reflector 10*a*, and therefore only M×N-1 actuators need be provided below the second surface of the support plate 22 for the M×N optical switch matrix according to the present invention.

In the embodiment shown in FIG. 1, the optical switch matrix comprises a 5×4 reflector array, illustrating that the number of columns M may be different from the number of rows N in the optical switch matrix according to the present invention. In another embodiment, the M×N optical switch matrix comprises a square matrix wherein M=N and the number of secondary optical ports is equal to the number of primary optical ports.

Figure 2:
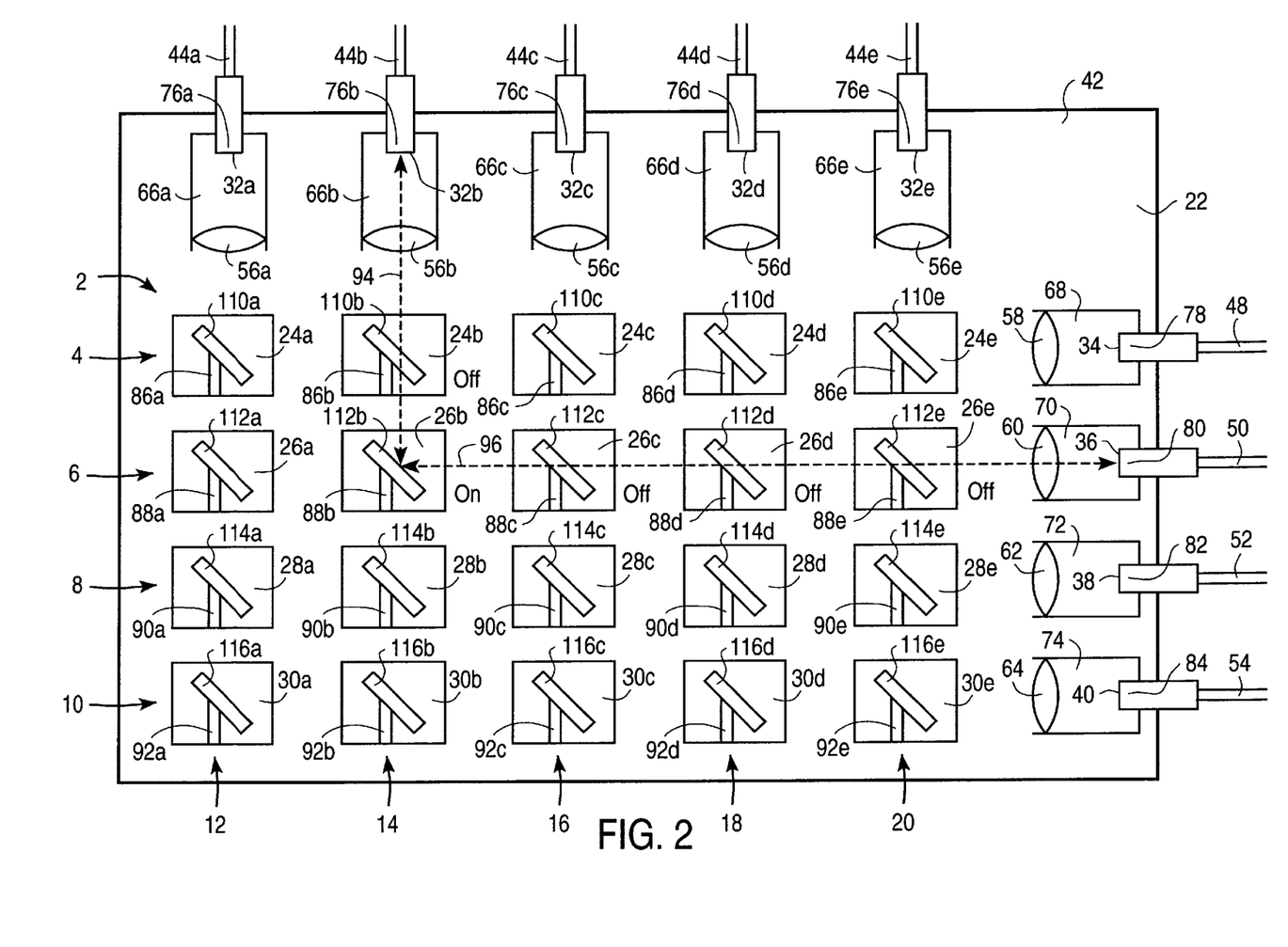
FIG. 2 shows a top plan view of another embodiment of the optical switch matrix according to the present invention.

FIG. 2 shows another embodiment of the mechanically actuated optical switch matrix according to the present invention. The embodiment shown in FIG. 2 is similar to the embodiment shown in FIG. 1 and described above, except that the prisms 4a, 4b, ... 4e, 6a, 6b, ... 6e, 8a, 8b, ... 8e, and 10a, 10b, ... 10e are replaced by a plurality of mirrors 110a, 110b, ... 110e, 112a, 112b, ... 112e, 114a, 114b, ... 114e, and 116a, 116b, ... 116e, respectively. It is apparent to a person skilled in the art to use either prisms or mirrors as optical reflectors in a mechanically actuated M×N optical switch, although other types of optical switching elements can also be used within the scope of the present invention. For infrared optical wavelengths in the range of about 1500 nm to about 1550 nm, which are typically used in many conventional optical fiber communications systems, prisms may provide an advantage of slightly lower insertion loss over conventional mirrors.

In another embodiment, the mirror 116a is fixedly connected to the first surface 42 of the support plate 22 whereas other mirrors 110a, 110b, ... 10e, 112a, 112b, ... 112e, 114a, 114b, ... 114e, and 116b, 116c, ... 116e can be movably switched between their on and off positions by actuators (not shown in the top plan view of FIG. 2) which are located below the second surface of the support plate 22. The mechanical assemblies for actuating the movable mirrors in FIG. 2 may be identical to those for actuating the movable prisms in FIG. 1, and will be described below in reference to FIGS. 3 and 4. Whereas the reflection surface of a prism is behind the triangular prism medium and light travels through the prism medium before and after it is reflected by the reflection surface, a mirror has a reflection surface which reflects light directly in free space. Although prisms generally have lower insertion losses when used as optical reflectors at infrared wavelengths in the range of about 1500 nm to about 1550 nm, mirrors may also be used as optical reflectors in some applications.

Figure 3:
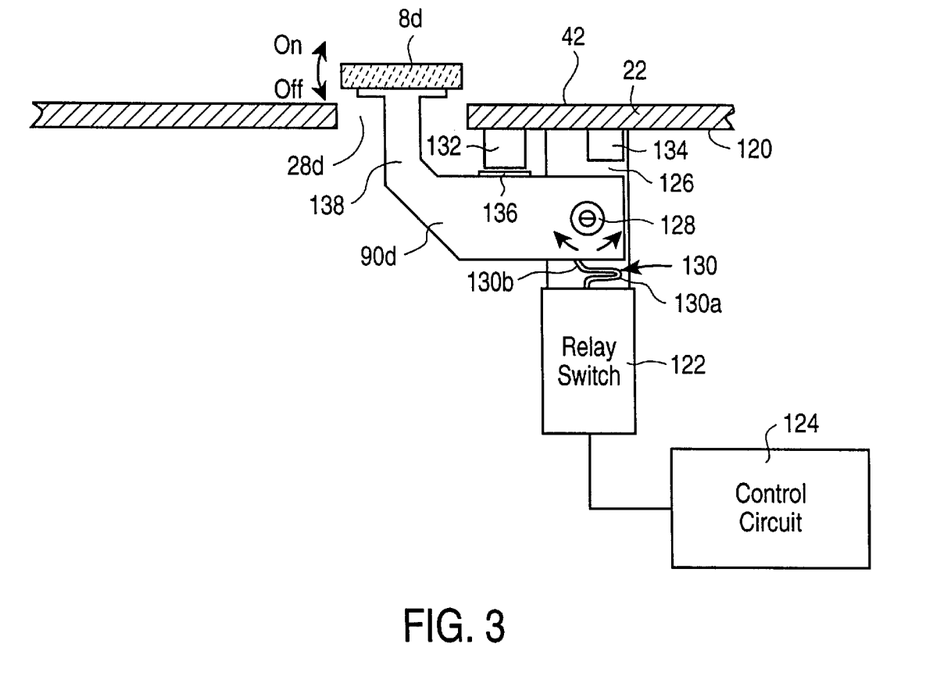
FIG. 3 shows a sectional view of an embodiment of a mechanical assembly for actuating the movable optical reflectors in the optical switch matrix according to the present invention.

FIG. 3 shows a sectional view of an embodiment of a mechanical assembly for actuating the movable optical reflectors in the M×N optical switch matrix according to the present invention. The sectional view of FIG. 3 is obtained along sectional line 101—101 in FIG. 1 for the movable optical reflector 8d. In this embodiment, the location of the mechanical assembly below the second surface 120 of the support plate 22 avoids the blockage of optical paths above the first surface 42 of the support plate 2 and frees the first surface 42 of the support plate 22 from being cluttered with mechanical elements. Referring to FIG. 3, an actuator 122 which comprises a conventional solenoid relay switch is provided below the second surface 120 of the support plate 22. In this embodiment, the relay switch 122 is capable of generating repetitive mechanical movements in opposite directions roughly parallel to the second surface 120 of the support plate 122.

The mechanical movements of the relay switch 122 are controlled by voltages generated by a conventional control circuit 124, which can be designed in a conventional manner apparent to a person skilled in the art. For example, a single control circuit 124 may be implemented to control the mechanical movements of all of the actuators for the movable optical reflectors in the M×N optical switch matrix according to the present invention. In the embodiment shown in FIG. 3, the relay switch 122 is vertically mounted to a fixed member 126 which also supports a stable axle assembly 128. The fixed member 126 is connected to the second surface 120 of the support plate 22. The lever 90d is pivotably supported by the axle assembly 128 to drive the movable optical reflector 8d between its on and off positions. Although the movable optical reflector 8d is shown as a prism in the sectional view of FIG. 3, a mirror may be used instead of the prism in a different embodiment.

In the embodiment shown in FIG. 3, a flexible connector 130 is connected between the relay switch 122 and the lever 90d to transfer mechanical movements generated by the relay switch 122 to the lever 90d. In an embodiment, the flexible connector 130 comprises at least two bent metal wires 130a and 130b. In FIG. 3, two fixed blocks 132 and 134 are provided on the second surface 120 of the support plate 22 to stop the lever 90d from moving farther when the movable optical reflector 8d reaches its designated on and off positions.

In the embodiment shown in FIG. 3, roughly horizontal movements generated by the relay switch 122 are translated by the flexible connector 130 and the lever 90d into roughly vertical movements of the movable optical reflector 8d with respect to the support plate 22. A portion 138 of the lever 90d which is connected to the movable optical reflector 8d is movably positioned through the aperture 28d in the support plate 22.

In an embodiment, a contact pad 136 is provided on the lever 90d opposite the first fixed block 132. When the movable optical reflector 8d reaches its designated on position, the contact pad 136 is in contact with the first fixed block 132. The second fixed block 134 stops the lever 90d from moving farther in the opposite direction when the movable optical reflector 8d reaches its off position. Further details of the mechanical assembly as shown in FIG. 3 are described in U.S. patent application Ser. No. 09/416,444, titled "Actuator Assembly for Optical Switches", filed Oct. 12, 1999, which is incorporated herein by reference.

Figure 4:
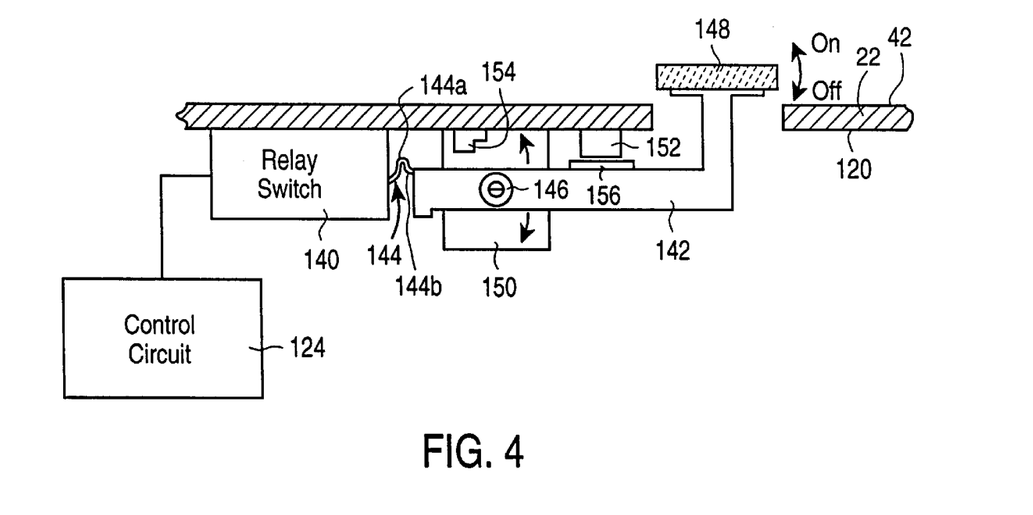
FIG. 4 shows a sectional view of another embodiment of a mechanical assembly for actuating the movable optical reflectors in the optical switch matrix according to the present invention.

FIG. 4 shows a sectional view of another embodiment of a mechanical assembly for actuating a movable optical reflector in the M×N optical switch matrix according to the present invention. In this embodiment, the location of the mechanical assembly below the second surface 120 of the support plate 22 avoids the blockage of optical paths above the first surface 42 of the support plate 2 and frees the first surface 42 of the support plate 22 from being cluttered with mechanical elements. The actuator 140, which comprises a conventional solenoid relay switch, is capable of generating repetitive movements in opposite directions roughly perpendicular to the second surface 120 of the support plate 22.

The mechanical movements generated by the relay switch 140 are controlled by a conventional control circuit 124 which can be designed in a manner apparent to a person skilled in the art. The movements generated by the relay switch 140 are transferred to a lever 142 through a flexible connector 144, which in an embodiment comprises a pair of bent metal wires 144a and 144b. The lever 142, which is pivotably supported by a stable axle assembly 146, transfers the mechanical movements generated by the relay switch 140 to a movable optical reflector 148, which is shown as a prism in the sectional view of FIG. 4. The axle assembly 146 is supported by a fixed member 150 which is connected to the second surface 120 of the support plate 22.

In the embodiment shown in FIG. 4, two fixed blocks 152 and 154 are provided on the second surface 120 of the support plate 22 to stop further movements of the lever 142 to set the optical reflector 148 in its designated on and off positions. In an embodiment, a contact pad 156 is provided on the lever 142 opposite the first fixed block 152, such that when the contact pad 156 is in contact with the first fixed block 152, the optical reflector 148 is stopped in its designated on position. The second fixed block 154 is positioned to stop the lever 142 from moving farther in the opposite direction when the optical reflector 148 reaches its off position. Further details of the mechanical assembly as shown in FIG. 4 are also described in U.S. patent application Ser. No. 09/416,444, titled "Actuator Assembly for Optical Switches", filed Oct. 12, 1999, which is incorporated herein by reference.

In the M×N optical switch matrix according to the present invention, it is desirable that adjacent optical reflectors be closely positioned together to reduce the lengths of optical paths between the optical reflectors and the input and output optical ports in the reflector array. For example, if the movable optical reflectors in the reflector array 2 in FIG. 1 are spaced closer together, the optical path between the optical reflector 10*a* and the input optical port 32*a* as well as the optical path between the output optical port 40 and the optical reflector 10*a* can be shortened. In a relatively large M×N optical switch matrix in which the optical reflector array comprises a large number of columns and rows of optical reflectors, closer spacings between adjacent optical reflectors can reduce the effect of optical dispersion as light travels between the optical reflectors and the respective input and output optical ports. The embodiment of the mechanical assembly as shown in FIG. 3 with a vertically mounted relay switch 122 and a relatively short lever 90*d* allows spacings between adjacent rows and columns of movable optical reflectors in the M×N optical switch matrix according to the present invention to be significantly reduced.

The mechanical assembly with the vertically mounted relay switch 122 and the relatively short lever 90*d* as shown in FIG. 3 may be located in the space below the support plate 2 between adjacent columns or adjacent rows of optical reflectors in the M×N optical switch matrix. For example, the relay switch 122 and the fixed member 126 for supporting the axle assembly 128 as shown in FIG. 3 may be located in the space below the second surface 120 of the support plate 22 between adjacent optical reflectors 8*d* and 8*e* in FIG. 1. Alternatively, the mechanical assembly as shown in FIG. 3 may be placed between adjacent optical reflectors 8*d* and 10*d* in FIG. 1, below the second surface of the support plate 22.

In a relatively small M×N optical switch matrix, the mechanical assembly as shown in FIG. 4 with a horizontally mounted relay switch 140 and a relatively long lever 142 may be provided below the second surface 120 of the support plate 22 to drive each of the movable optical reflectors between its on and off positions.

For example, mechanical assemblies as the one shown in FIG. 4 may be implemented for actuating movable optical reflectors in a 2×2 optical switch matrix, with two of the relay switches mounted on one side and the other two relay switches mounted on an opposite side of the 2×2 reflector array below the second surface of the support plate. For the 2×2 optical switch matrix, minimal spacings between adjacent optical reflectors can be maintained even if the mechanical assemblies with horizontally mounted relay switches as the one shown in FIG. 4 are used for actuating the optical reflectors.

Figure 5:
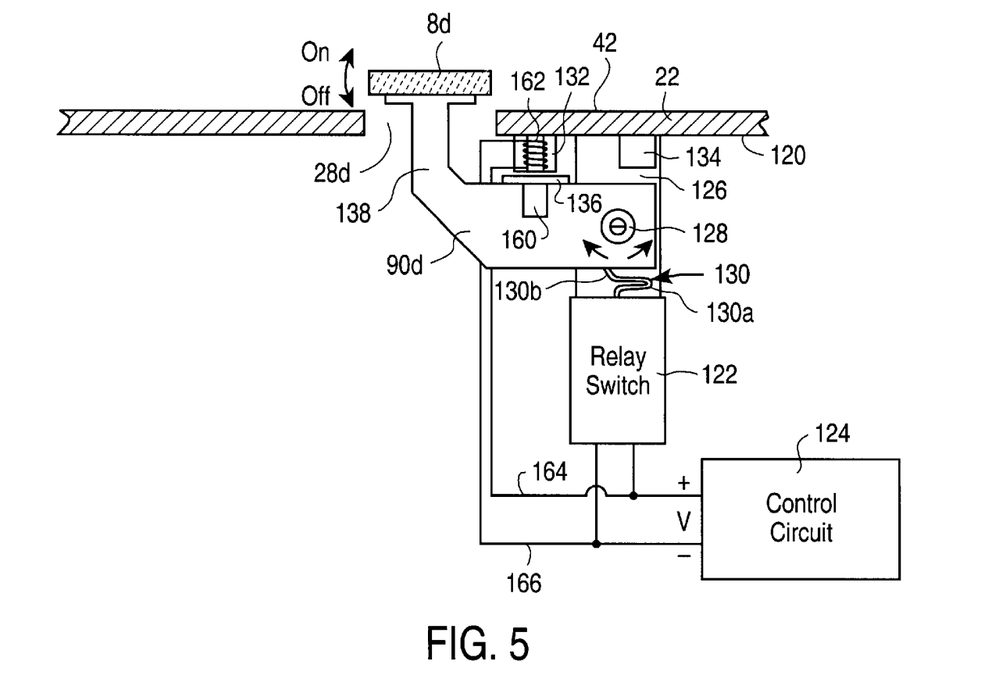
FIG. 5 shows a sectional view of another embodiment of the mechanical assembly similar to FIG. 3, with the additions of a magnet and a solenoid for faster switching of the optical switching element from its off position to its on position.
Figure 6:
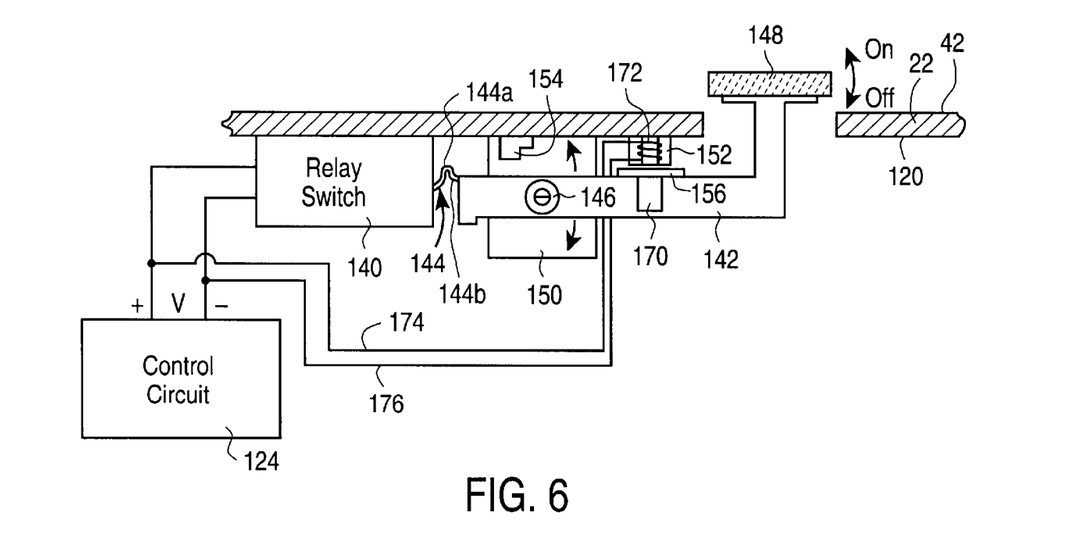
FIG. 6 shows a sectional view of another embodiment of the mechanical assembly similar to FIG. 4, with the additions of a magnet and a solenoid for faster switching of the optical switching element from its off position to its on position.

FIGS. 5 and 6 show further embodiments of mechanical assemblies for the M×N optical switch matrix according to the present invention. FIG. 5 shows a sectional view of an embodiment of the mechanical assembly similar to that which is shown in FIG. 3 and described above, with the additions of a magnet 160 attached to the contact pad 136 and a solenoid 162 on the second surface 120 of the support plate 22. In the embodiment shown in FIG. 5, the solenoid 162 is positioned within the first metal block 132. A hollow interior may be provided in the first metal block 132 to allow sufficient space for the solenoid 162. The control circuit 124, which supplies an actuating voltage V to the relay switch 122 for generating repetitive movements in opposite directions, also supplies the same actuating voltage V to the solenoid 162 through conductive lines 164 and 166.

When the actuating voltage V is applied to the relay switch 122 to move the optical switching element 8*d* from its off position to its on position, it also causes a current to flow through the solenoid 162 to produce a magnetic field for attracting the magnet 160. In an embodiment, the magnet 160 is a permanent magnet which generates a strong magnetic field. With the additional force of magnetic attraction between the permanent magnet 160 and the solenoid 162, the optical switching element 8*d* can be switched from its off position to its on position within a shorter switching time. When the optical switching element 8*d* is switched from its on position to its off position, the polarity of the actuating voltage V is reversed to cause the relay switch to generate an opposite motion. The magnetic field produced by the solenoid 162 is also reversed, thereby repelling the permanent magnet 160 downward to move the optical switching element 8*d* from its on position to its off position.

FIG. 6 shows an embodiment of the mechanical assembly similar to that which is shown in FIG. 4 and described above, with the additions of a magnet 170 which is connected to the contact pad 156 on the lever 142 and a solenoid 172 which is connected to the second surface 120 of the support plate 22. In an embodiment, the magnet 170 is a permanent magnet which generates a strong magnetic field. The solenoid 172 is connected to the second surface 120 of the support plate 22 at a position opposite the contact pad 156 and the magnet 170. In an embodiment, the solenoid 172 is positioned within the first metal block 152, which is provided with a hollow interior to house the solenoid 172.

In the embodiment shown in FIG. 6, the control circuit 124 supplies an actuating voltage V to the actuator 140. In an embodiment, the actuator 140 generates repetitive movements in opposite directions depending upon the changes in polarities of the actuating voltage V supplied by the control circuit 124. In the embodiment shown in FIG. 6, the actuating voltage V generated by the control circuit 124 is also supplied to the solenoid 172 through conductive lines 174 and 176. When the optical switching element 148 is switched from its off position to its on position, the voltage V supplied by the control circuit 124 forces a current through the solenoid 172 to generate a magnetic field for attracting the permanent magnet 170.

Because of the magnetic force of attraction between the permanent magnet 170 and the solenoid 172 when the optical switching element 148 is moved from its off position to its on position, the switching time for the optical switching element 148 to reach its on position from its off position can be reduced compared to the embodiment shown in FIG. 4 in which the optical switching element 148 relies solely upon the force generated by the relay switch 140 to move to its on position.

Referring to FIG. 6, when the control circuit 124 reverses the polarity of the actuating voltage V to cause the relay switch 140 to move the optical switching element 148 from its on position to its off position, the polarity of the voltage supplied to the solenoid 172 is also reversed. The current through the solenoid 172 thus flows in a reverse direction to generate a reverse magnetic field to repel the permanent magnet 170 downward away from the solenoid 172. The repelling force between the solenoid 172 and the permanent magnet 170 in addition to the force generated by the relay switch 140 causes the optical switching element 148 to move quickly from its on position to its off position when the polarity of the actuating voltage V is reversed.

When the actuating voltage V is supplied to both the relay switch 140 and the solenoid 172 to move the optical switching element 148 to its on position, a strong magnetic force of attraction between the solenoid 172 and the permanent magnet 170 causes the contact pad 156 to move quickly toward the first metal block 152 in addition to the actuating force transferred from the relay switch 140 to the lever 142 through the flexible connector 144. The solenoid 172 and the permanent magnet 170 allow the switching time of the optical switching element 148 from its off position to its on position to be reduced to about 15 ms or less. After the optical switching element 148 reaches its on position, the force of attraction between the permanent magnet 170 and the solenoid 172 ensures that the contact pad 156 is in secure contact with the first metal block 152. In an embodiment, the first metal block 152 comprises a nonferrous metal such as copper or aluminum. In a further embodiment, the contact pad also comprises a nonferrous metal.

In an embodiment, conventional solenoids with iron cores may be implemented to attract and to repel the permanent magnets 160 and 170 as shown in FIGS. 5 and 6, respectively. In an embodiment, the contact pads 136 and 156 in FIGS. 5 and 6 may have surfaces wider than the widths of the levers 90d and 142 to allow the permanent magnets 160 and 170 to be attached to the contact pads 136 and 156 at positions external to the levers 90d and 142, respectively. In another embodiment, the permanent magnets may be positioned inside the levers, provided that the levers are made of nonferrous metals. Although the solenoids 162 and 172 are shown as being positioned inside the first metal blocks 132 and 152 in FIGS. 5 and 6, respectively, the solenoids may also be positioned outside the respective first metal blocks in a different embodiment, as long as the solenoids are able to produce sufficiently strong forces of attraction and repulsion on the respective permanent magnets.

The invention has been described with respect to particular embodiments thereof, and numerous modifications can be made which are within the scope of the invention as set forth in the claims.

What is claimed is:

1. An optical switch, comprising:

(a) a plurality of primary optical ports arranged in a row;

(b) a plurality of secondary optical ports arranged in a column;

(c) a perforated support plate having first and second surfaces opposite each other, the perforated support plate having at least one aperture through the first and second surfaces;

(d) a reflector array comprising a plurality of movable optical reflectors arranged in a plurality of columns and rows, each of the movable optical reflectors individually movable with respect to the support plate, each of the movable optical reflectors capable of occupying an on position to intercept incoming light on a respective first optical path from a respective one of the primary optical ports or an off position away from the respective first optical path, each of the movable optical reflectors having a reflection surface angled with respect to the respective first optical path when the movable optical reflector is in the on position to reflect the light onto a respective second optical path leading to a respective one of the secondary optical ports, wherein each of the movable optical reflectors is switched from the on position to the off position by moving toward the aperture away from the respective first optical path, and wherein each of the movable optical reflectors is switched from the off position to the on position by moving away from the aperture onto the respective first optical path;

(e) means for switching the movable optical reflectors between their on and off positions;

(f) a plurality of primary lenses arranged in a row, each of the primary lenses positioned adjacent a-respective one of the primary optical ports to collimate the incoming light on the respective first optical path; and (g) a plurality of secondary lenses arranged in a column, each of the secondary lenses positioned adjacent a respective one of the secondary optical ports to collimate light on the respective second optical path.

2. The optical switch of claim 1, wherein the actuators comprise relay switches.

3. The optical switch of claim 1, wherein the means for switching the movable optical reflectors comprise a plurality of actuators disposed on the second surface of the support plate.

4. The optical switch of claim 3, wherein the means for switching the movable optical reflectors further comprise a plurality of levers connected between the actuators and the movable optical reflectors, each of the levers movably positioned through the aperture to drive a respective one of the movable optical reflectors between its on and off positions.

5. The optical switch of claim 3, wherein at least two of the optical reflectors in different columns and rows are capable of being selected at a time to be switched to their on positions to reflect light from the respective first optical paths onto the respective second optical paths leading to the respective secondary optical ports.

6. The optical switch of claim 1, wherein the movable optical reflectors comprise mirrors.

7. The optical switch of claim 1, wherein the movable optical reflectors comprise prisms.

8. The optical switch of claim 1, wherein the reflection surface of each of the movable optical reflectors is angled at 45° with respect to the first optical path.

9. The optical switch of claim 1, further comprising:

(h) a plurality of input optical fibers connected to the primary optical ports respective; and (i) a plurality of output optical fibers connected to the secondary optical ports respectively.

10. The optical switch of claim 1, wherein the reflector array further comprises a fixed optical reflector connected to the first surface of the support plate to reflect light from the respective first optical path onto the respective second optical path when all of the movable optical reflectors are in their off positions.

* * * * *